(No Model.) 3 Sheets—Sheet 1.

A. RYAN.
COMBINED HAY RAKE AND STACKER.

No. 526,819. Patented Oct. 2, 1894.

Witnesses
Jas. K. McCathran
L. P. Rochampter

Inventor
Arthur Ryan
by Al Mour & Co
Attorneys

THE NORRIS PETERS CO., PHOTO-LITHO., WASHINGTON, D. C.

(No Model.)   3 Sheets—Sheet 2.

A. RYAN.
COMBINED HAY RAKE AND STACKER.

No. 526,819. Patented Oct. 2, 1894.

Witnesses
Jas. K. McCatpran
S. P. Worhaupter

Inventor
Arthur Ryan
by C. A. Snow & Co.
Attorneys

THE NORRIS PETERS CO., PHOTO-LITHO., WASHINGTON, D. C.

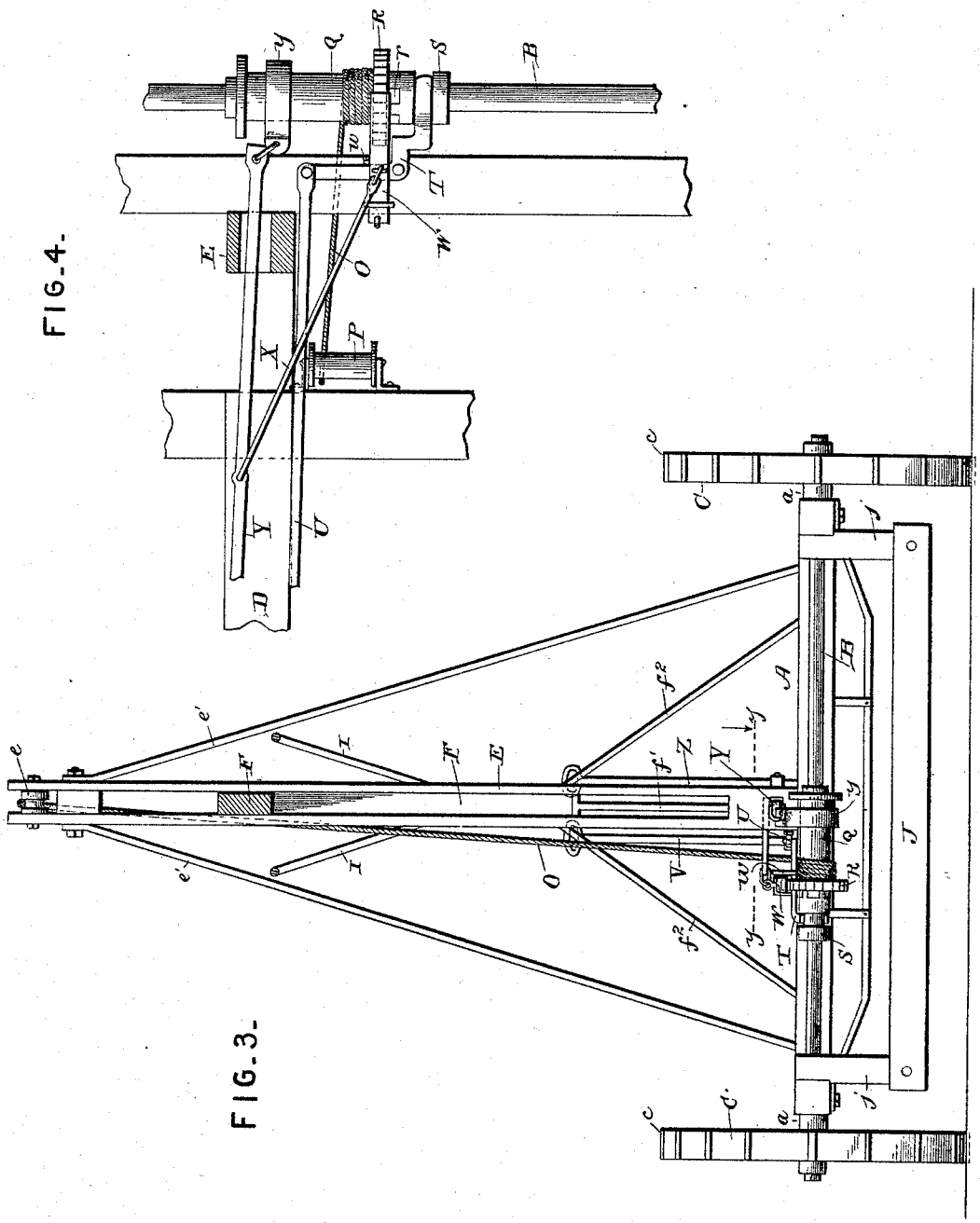

UNITED STATES PATENT OFFICE.

ARTHUR RYAN, OF COLBERGEN, NEBRASKA, ASSIGNOR OF ONE-HALF TO WARWICK GUY, OF SAME PLACE.

COMBINED HAY RAKE AND STACKER.

SPECIFICATION forming part of Letters Patent No. 526,819, dated October 2, 1894.

Application filed April 26, 1893. Serial No. 471,951. (No model.)

*To all whom it may concern:*

Be it known that I, ARTHUR RYAN, a citizen of the United States, residing at Colbergen, in the county of Pierce and State of Nebraska, have invented a new and useful Combined Hay Rake and Stacker, of which the following is a specification.

This invention relates to combined hay-rakes and stackers; and it has for its object to provide an improved machine of this character which shall provide efficient means for automatically gathering hay from a field, and elevating it to stack the same at the option of the operator.

To this end the main and primary object of the present invention is to provide a strong and durable combined hay-rake or gatherer and stacker which shall be so constructed as to efficiently secure the objects for which it is designed.

With these and other objects in view which will readily appear as the nature of the invention is better understood, the same consists in the novel construction, combination and arrangement of parts hereinafter more fully described, illustrated and claimed.

Figure 1:
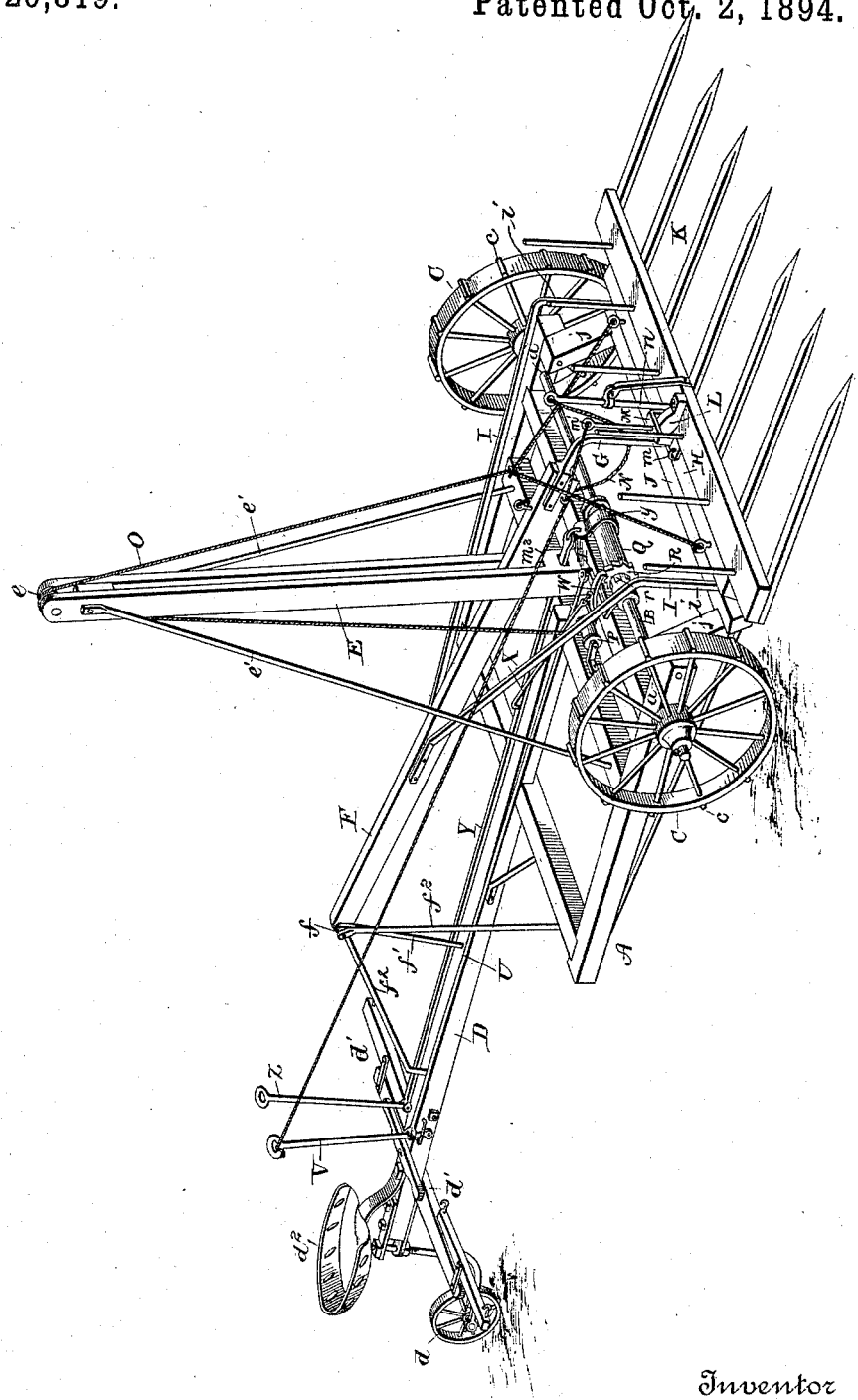
Figure 2:
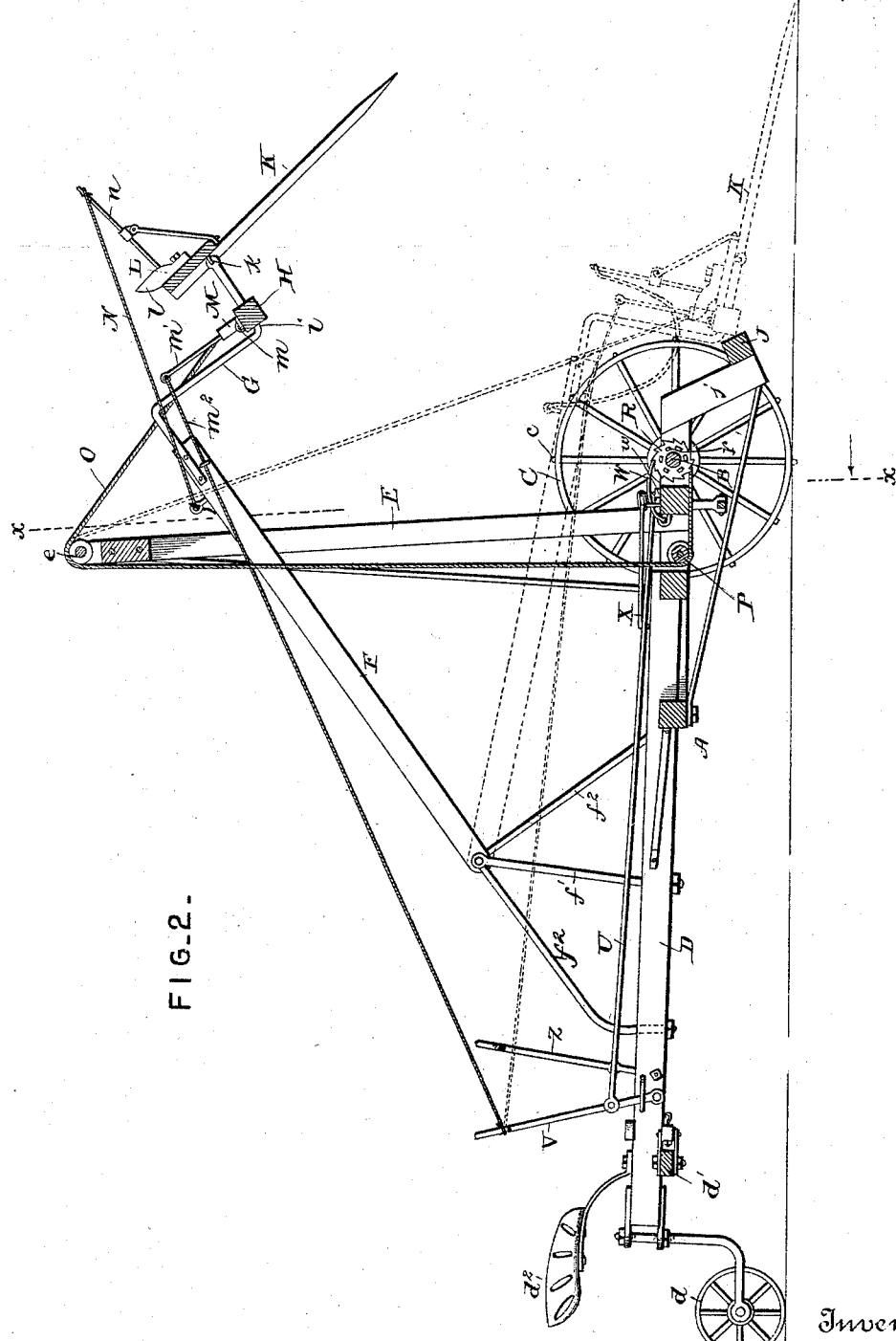

In the accompanying drawings:—Figure 1 is a perspective view of a combined gatherer and stacker constructed in accordance with this invention. Fig. 2 is a vertical longitudinal central sectional view of the same showing in full lines the elevated and tilted positions of the fork, and in dotted lines the lowered locked position of the same as it gathers the hay. Fig. 3 is a transverse sectional view on the line $x$—$x$ of Fig. 2. Fig. 4 is a detail sectional view on the line $y$—$y$ of Fig. 3, showing more clearly the connections of the operating devices.

Referring to the accompanying drawings, A represents a suitably constructed frame having at the forward ends thereof the bearings $a$, in which is journaled the transverse axle-shaft B, to the opposite ends of which are secured the traveling wheels C, having the broad calked tires $c$, so as to secure a firm purchase in the ground as the machine is traveling thereover, and one or both of said wheels are fast on the axle shaft so as to provide means for turning the same in order to operate the winding devices hereinafter described.

The frame A, is supported in a position to travel in an approximately horizontal position over the ground, and has attached to the rear end thereof the rearwardly extending braced tongue D. The tongue D, has journaled or swiveled to the rear extremity thereof the traveling guide caster wheel $d$, which not only serves to support the rear end of the machine, but also acts as a guide for the machine, and pivotally attached to the tongue D, near the rear extremity thereof, is the doubletree $d'$, to which the draft animals are attached for pushing the machine in front of them to gather up and stack the hay. A driver's seat $d^2$, is attached to the tongue D, directly adjacent to the doubletree in any suitable manner.

Arising from the frame A, near the forward end thereof, is the vertically slotted derrick standard E, carrying at its upper extremity the derrick guide pulley $e$, and firmly braced to the frame A, by means of the opposite diagonal bracing rods $e'$. The vertically slotted derrick standard E, forms a guide for the swinging or pivoted fork lever F. The fork lever F, is adapted to move up and down within the vertical slot of the derrick standard, and is pivoted at its inner end $f$, to the upper end of the upright bearing arm $f'$, secured to the rearwardly extending tongue D, and said upright bearing arm is firmly braced in its position to form a pivotal support for the fork lever by the diagonal brace rods $f^2$, secured to the upper end of the same and the frame and tongue respectively. The pivoted fork lever F, has attached to the outer swinging end thereof the angled attaching foot G, to the lower extremity of which is fixedly secured the transverse end or fork bar H, which is firmly braced in a horizontal position at the outer end of the fork lever by means of the opposite diverging brace arms I, secured at one end to the fork lever F, and provided at their other outer ends with the angled feet $i$, connected to the opposite ends of the end bar H. When the fork lever F, is in its lowered position, clearly shown in Figs. 1 and 2 of the drawings, the same is designed to rest flat against the forwardly projected rest bar J, secured to the lower end of the arms j, attached to the front extremities of the frame A, so that the weight carried by the outer end of the fork lever will be placed on the body or frame of the machine, so that there will be no undue straining of parts.

The transverse end or fork bar H, is designed to carry the gathering and lifting fork K. The gathering and lifting fork K, is constructed in the ordinary shape of forks employed in similar machines, and is pivoted by the pivotal connections k, to the end or fork bar H, so that after the fork has been elevated to a stacking position, it can be tilted downward so as to discharge its load onto the stack. A trip pin L, is secured to the fork head at a point intermediate of its ends and is provided with a beveled projecting end l, adapted to normally project into the U-shaped latch plate M. The U-shaped latch plate M, is pivoted at one edge as at m, to the transverse end or fork bar H, so that of its own weight it will normally rest in an upright or closed position on top of the bar H, and thereby fit over the beveled end of the trip pin, so that the fork cannot be tilted until said latch plate is thrown back of the trip pin. A trip arm m', is secured to the top of the U-shaped latch plate M, and has attached thereto the trip cord m², which leads to a point convenient to the driver, so that by pulling on said cord the latch plate can be drawn back to allow the fork to automatically tilt and dump its load onto the stack, after the fork has gathered its load and been lifted to an elevated position as shown in Fig. 2 of the drawings.

The downward tilt of the gathering and lifting fork K, is limited by the stop cord N, attached fast at one end to the outer end of the fork lever F, and fast at its other end to a braced attaching arm n, secured to the fork head. By lengthening or shortening this cord the degree of slant or tilt of the fork can be regulated.

In the present invention it is intended that after the fork has gathered its load, to automatically elevate the fork to a position so that it can be tilted as previously described, and to effect this I employ the hoisting rope O, attached to opposite ends of the end or fork bar H, and passing over the guide pulley e, at the top of the derrick standard E, and leading to the winding devices which I shall now proceed to describe. The hoisting or elevating rope O, after passing over the top pulley e, is passed around a suitably arranged frame pulley P, attached to the frame A, and is connected at its other end to the winding drum Q. The winding drum Q, is somewhat elongated and is loosely mounted on the axle shaft B. The winding drum Q, is provided at one end with a ratchet flange R, and the clutch face r, opposite which latter is designed to work a movable clutch sleeve S. The movable clutch sleeve S, is mounted to slide on and turn with the shaft B, and has connected thereto the shifting bell crank lever T. The shifting bell crank lever T, has attached to one end thereof the operating rod U, which rod is pivotally connected to the controlling lever V, attached to the tongue D, near the driver's seat, so that the clutch sleeve can be readily thrown in and out of engagement with the winding drum. After the gathering and lifting fork K, has gathered up a load of hay, to elevate the same, it is simply necessary for the operator to pull the lever V, toward him, so that the clutch sleeve will be thrown into engagement with the clutch face of the winding drum, to cause the latter to turn with the axle shaft as the machine advances. The winding drum now winds up the rope O, thereon, and elevates the fork to the desired height at which the same is to be tilted, as already described.

The fork K, may be held elevated at any height, and is prevented from falling to the ground by reason of the clutch devices slipping out of engagement, by means of the pivoted check dog W. The check dog W, is pivoted to the frame A, adjacent to the ratchet flange of the winding drum, and is held to its proper position over said flange by the offstanding guide arm w, adjacent to the dog, and pivotally attached at one end to the dog W, is the branch arm X, pivoted at its other end to the brake rod Y. The brake rod Y, is pivoted at one end to the band brake y, which embraces the winding drum Q, and at its other end to the combined brake and dog lever Z, pivoted adjacent to the lever V, so as to be under the control of the driver. Now it will be apparent that when the lever Z, is shoved forward, the band brake is loose on the winding drum, and the dog W, freely rides on top of the ratchet flange, and is free to engage such flange, so as to prevent the winding drum from unwinding during the lifting of the fork, and will serve to hold the fork in any elevated position. When it is desired to lower the fork to the ground, after the clutch sleeve has been thrown out of engagement with the winding drum, the lever Z, is pulled by the driver so as to release the dog from the ratchet flange. At the same time the band brake is tightened on the winding drum, so that the descent of the fork is properly eased.

It will of course be understood that the machine frame can be properly braced and trussed in any suitable manner to give the same the proper strength, and it will also be understood that changes in the form, proportion and the minor details of construction, as embraced within the scope of the appended claims, may be resorted to without departing from the principle or sacrificing any of the advantages of this invention.

Having thus described my invention, what I claim, and desire to secure by Letters Patent, is—

1. The combination with the wheeled frame and the axle-drum at one end of the frame; of an upright bearing-arm arranged at an intermediate point, a fork-lever pivoted at its inner end to said bearing-arm and having at its outer end an angled attaching foot, diverging brace-arms I secured at one end to opposite sides of the fork-lever and provided at their outer ends with angled feet $i$, a transverse end or fork-bar attached rigidly to the several angled feet, a tilting fork pivotally connected with said bar, a trip latch device for locking the said fork to said bar, and an operating connection between said drum and the fork-bar, substantially as set forth.

2. In a machine of the class described, the combination with the pivoted fork-lever having a fork-bar at its outer end; of a tilting fork pivotally connected with said fork-bar and having, at its inner pivoted end, a trip-pin provided with a beveled projecting end $l$, a U-shaped latch-plate M pivoted at one edge on top of said fork-bar and provided with a trip-arm $m'$ arising from its top, said latch-plate being adapted to normally engage over said trip-pin, and a trip-cord attached at one end to said trip-arm, substantially as set forth.

3. In a machine of the class described, the combination with the turning axle-shaft, and the swinging fork; of the clutch winding-drum mounted on said shaft and having a ratchet-flange at one end, a gravity check-dog pivoted adjacent to the winding drum and adapted to engage the top portion of the ratchet-flange, an off-standing guide-arm located adjacent to said dog and holding it to its work, a band-brake embracing the winding-drum, a lever-controlled brake-rod attached at one end to the band-brake, and a branch-arm X pivoted at one end to the brake-rod and at its other end to said gravity check-dog, substantially as set forth.

In testimony that I claim the foregoing as my own I have hereto affixed my signature in the presence of two witnesses.

ARTHUR RYAN.

Witnesses:
 W. E. HOAG,
 C. E. STALEY.